United States Patent
Clark

[11] Patent Number: 5,419,604
[45] Date of Patent: May 30, 1995

[54] PIVOTAL VISOR/WINDSHIELD FOR VESSELS

[76] Inventor: Brant V. Clark, 1103 York Rd., Cherry Hill, N.J. 08034

[21] Appl. No.: 92,297

[22] Filed: Jul. 15, 1993

[51] Int. Cl.⁶ .................................................. B60J 3/02
[52] U.S. Cl. ............................... 296/97.9; 296/97.12; 296/79; 296/96.2
[58] Field of Search .................. 296/97.1, 97.7, 97.9, 296/97.12, 97.13, 79, 84.1, 96.2, 96.21, 90

[56] References Cited

U.S. PATENT DOCUMENTS

| | | | |
|---|---|---|---|
| 1,094,665 | 4/1914 | Macleod | 296/79 |
| 1,107,352 | 8/1914 | Pugh | 296/84.1 |
| 1,177,626 | 4/1916 | Huff | 296/86 |
| 1,285,379 | 11/1918 | Reed | 296/97.8 |
| 1,470,553 | 10/1923 | Church | 296/97.9 X |
| 1,505,529 | 8/1924 | Belden | 296/96.21 X |
| 1,563,606 | 12/1925 | Williams | 296/96.21 |
| 1,669,228 | 5/1928 | Chamberlin | 296/84.1 X |
| 1,992,886 | 2/1935 | Potter | 296/96.2 |
| 2,416,761 | 3/1947 | Lande | 296/97.9 |
| 2,665,166 | 1/1954 | Roark . | |
| 3,121,924 | 2/1964 | Beisel | 296/96.21 X |
| 3,336,612 | 8/1967 | Stevens | 296/84.1 X |
| 3,843,982 | 10/1974 | Lane et al. | 296/84.1 X |
| 3,954,297 | 5/1976 | Linke et al. . | |
| 4,151,620 | 5/1979 | Heuzanter | 296/84.1 X |
| 4,248,473 | 2/1981 | Hildebrand . | |
| 4,617,699 | 10/1986 | Nakamura . | |
| 4,666,205 | 5/1987 | Nakagawa | 296/97.9 X |
| 4,690,450 | 9/1987 | Boerema et al. | 296/97.9 |
| 4,762,358 | 8/1988 | Levosky et al. . | |

FOREIGN PATENT DOCUMENTS

| | | | |
|---|---|---|---|
| 425896 | 5/1991 | European Pat. Off. | 296/97.5 |
| 635187 | 3/1928 | France | 296/95.1 |
| 1305142 | 8/1962 | France . | |
| 143329 | 9/1953 | Sweden . | |
| 175508 | 2/1922 | United Kingdom | 296/97.7 |

Primary Examiner—Joseph Pape
Attorney, Agent, or Firm—Caesar, Rivise, Bernstein, Cohen & Pokotilow, Ltd.

[57] ABSTRACT

A visor/windshield assembly for mounting on a vessel and including a movable panel, an elongated rigid member (e.g., hollow tube, solid rod), and plural C-shaped connector/brackets, and mounting devices, e.g., screws and other components. A first group of plural connector/brackets are fixedly secured to the panel at spaced locations therealong to releasably receive, e.g., snap-fit, the rigid member therein. A second group of plural connector/brackets is fixedly secured by the mounting devices to the vessel to releasably receive, e.g., snap-fit, the rigid member therein. The rigid member is formed of a rigid material, e.g., aluminum, to provide rigidity and/or structural stability to the panel. The rigid member is rotatable about its longitudinal axis with respect to the connector/brackets so that the panel is pivotal from a retracted position, to an extended position, with the panel in the extended position being generally in the line of sight of a person on the vessel. The assembly also includes a pair of adjustable holders for selectively holding the panel in the retracted position, the extended position, or in an intermediate position. The panel, the first group of connector/brackets, and the rigid member are arranged to be removed as a unit from the visor/windshield assembly on the vessel.

20 Claims, 2 Drawing Sheets

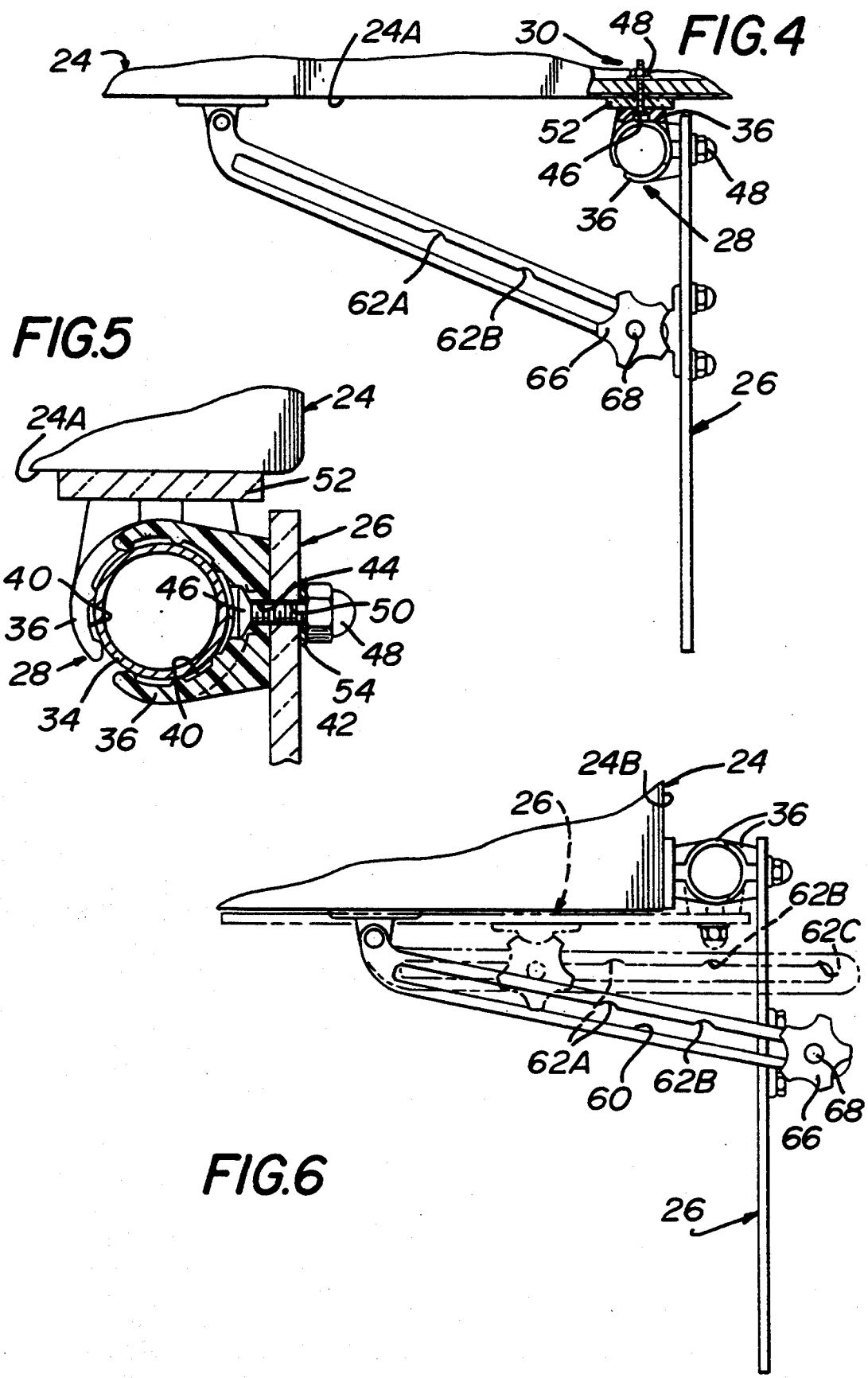

PIVOTAL VISOR/WINDSHIELD FOR VESSELS

BACKGROUND OF THE INVENTION

This invention relates generally to a visor/windshield for vessels, and more particularly to a pivotal visor/windshield for vessels.

Reference to "visor/windshield" or "visor/windshield assembly" in this application, unless more specifically limited, means a device having a pane or panel to be positioned within the line of sight of a person and the pane or panel ranging from completely transparent to opaque, depending upon the desired light transmissive properties, i.e., whether the pane or panel is intended to pass both visible light and ultraviolet rays (e.g., a clear, unpigmented windshield), or whether the pane or panel is intended to attenuate or block all or part of the visible light and/or ultraviolet rays (e.g., a pigmented (but transparent) or opaque sun visor or sun shield).

Reference to "vessel" or "vessels" in this application means any type of water-going vehicle (e.g., boat, ship, cruiser, etc.).

Sun visors suitable for use in automobiles and other land-going vehicles are disclosed in the following U.S. Pat. Nos.: 2,665,166 (Roark); 3,954,297 (Link et al.); 4,248,473 (Hildebrand); 4,617,699 (Nakamura); and 4,762,358 (Levosky et al.). Some of such sun visors can be rotated from a stowed or retracted position above or to the side of a windshield, to an operative position wherein they are located in a position disposed over a portion of the windshield through which the vehicle operator looks in order to block the sun's rays from the operator's eyes.

Typically the commercially available and/or patented sun visors are specially constructed of non-standard components and are relatively complex and expensive. Moreover, while some of these prior art visors may employ structures that are suitable for use in automobiles and other land-going vehicles, they are not believed to be well suited for use on vessels, either to provide a pivotal windshield, such as might be desirable for use on a flying bridge of a sports fishing boat, or to provide a sun visor to be positioned over a portion of a windshield to attenuate or block all or part of the visible light and/or ultraviolet rays.

Thus, a need exists for a visor/windshield assembly which is easy to mount and use on vessels, easy to remove for storage, and is formed of conventional, off-the-shelf components, so that it is of simple construction and relatively low cost.

OBJECTS OF THE INVENTION

Accordingly, it is a general object of this invention to provide a visor/windshield which overcomes the disadvantages of the prior art.

It is another object of this invention to provide a visor/windshield which is formed of conventional, off-the-shelf, components so that it is of simple construction and relatively low cost.

It is another object of this invention to provide a visor/windshield which is easy to mount adjacent the windshield of a vessel, to thereby function as a sun visor or sun shield.

It is another object of this invention to provide a visor/windshield for vessels which is easy to be moved from a stowed or retracted position to an operative position in the line of sight of an operator of the vessel, or of other individuals on the vessel.

It is another object of this invention to provide a visor/windshield for vessels which can be removed easily for storage.

SUMMARY OF THE INVENTION

The above and other objects of this invention are achieved by providing a visor/windshield assembly for mounting on a vessel. The visor/windshield assembly comprising a movable panel, pivotal connection means, and mounting means. The panel comprises a sheet which can range from completely transparent to opaque, depending upon the desired light transmissive properties. In a preferred form of the invention the panel functions as a sun visor, and is constructed of a light-attenuating material, e.g., a colored acrylic. The pivotal connection means comprises at least one elongated rigid member, preferably in the form of a hollow tube, and at least four conventional, generally C-shaped connector/brackets.

A first and a second of the connector/brackets are fixedly secured to the panel at spaced locations therealong to releasably receive, e.g., snap-fit, the tube therein. The third and fourth of the connector/brackets are fixedly secured by the mounting means to the vessel and are arranged to releasably receive, e.g., snap-fit, the tube therein. The tube has a longitudinal axis and is rotatable about that axis with respect to the connector/brackets, whereupon the panel is pivotal from a retracted position, wherein it is located remote from a predetermined position within the line of sight of a person on the vessel (e.g., remote from a position overlying a windshield of the vessel when the panel is intended to function as a sun visor for the windshield), to an extended position, wherein it is located generally in the line of sight of individuals on the vessel, e.g., over a portion of a windshield to attenuate light passing therethrough to the eyes of the operator of the vessel or to the eyes of other persons on the vessel.

In accordance with one preferred aspect of the invention, the panel, the first and second connector/brackets, and the tube are arranged to be removed easily as a unit from the visor/windshield assembly for storage or for other purposes (e.g., repair), leaving the mounting means and the third and fourth connector/brackets secured to the vessel.

DESCRIPTION OF THE DRAWINGS

Other objects and many of the attendant advantages of this invention will become readily appreciated as the same becomes better understood by reference to the following detailed description when considered in connection with the accompanying drawings wherein:

FIG. 4 is an end view, partially in section, of the visor/windshield assembly of FIG. 1 shown in the extended position;

FIG. 5 is an enlarged sectional view taken along lines 5—5 of FIG. 2; and

FIG. 6 is an end view of a visor/windshield assembly of FIG. 1 mounted on a vertical surface and shown in its extended, operative position;

DETAILED DESCRIPTION OF THE PREFERRED EMBODIMENTS

Figure 1:
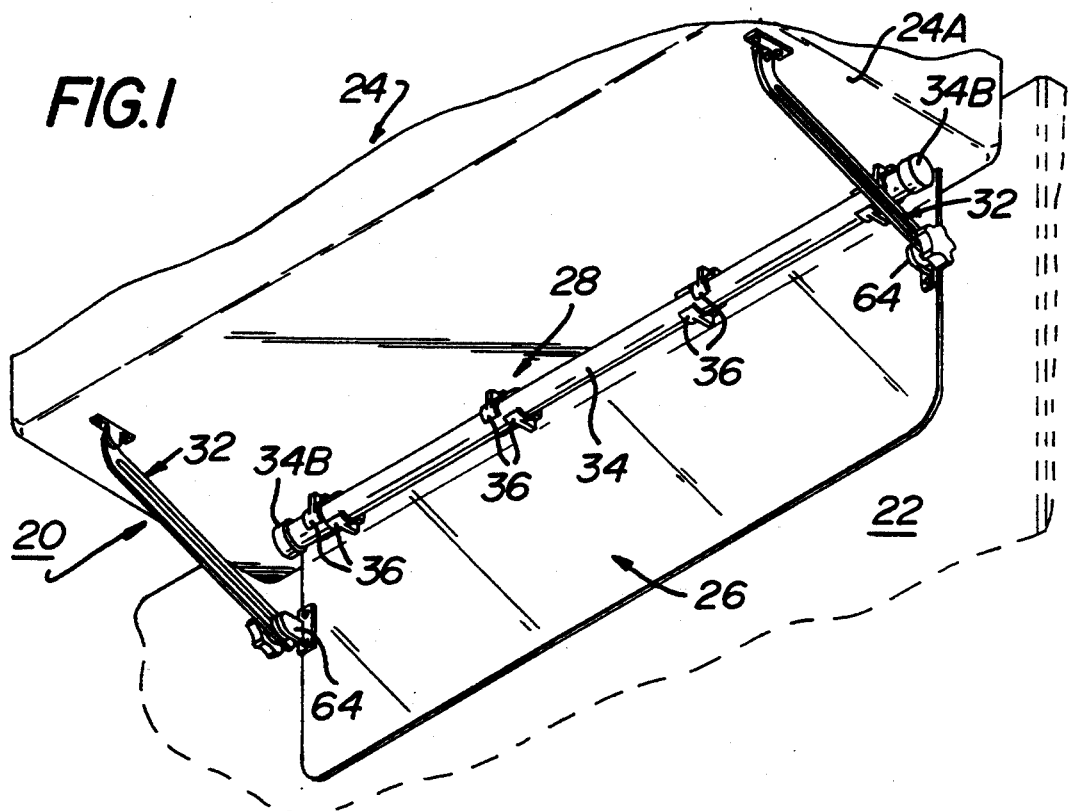
FIG. 1 is an isometric view, with the windshield shown in phantom, of a visor/windshield assembly constructed in accordance with this invention mounted on a horizontal surface over a windshield of a vessel and shown in its extended, operative position.

Referring now to the various figures of the drawings, wherein like reference numerals refer to like parts, there is shown at 20 in FIG. 1 a visor/windshield assembly constructed in accordance with this invention for mounting adjacent a windshield 22 of a vessel 24. The visor/windshield assembly 20 basically comprises a visor/windshield panel or pane 26, a movable and releasably securable connector/bracket subassembly 28, plural mounting devices 30 (one of which is shown in FIG. 4), and a pair of adjuster subassemblies 32.

Although the embodiments of this invention specifically described hereinafter are utilized in connection with the windshield 22 to function as a sun visor for attenuating light, in accordance with the broadest aspects of the invention, as was described earlier, the panel or pane 26 can actually function as the windshield itself, and also does not need to possess the light-attenuating properties of a sun visor or sun shield.

Figure 2:
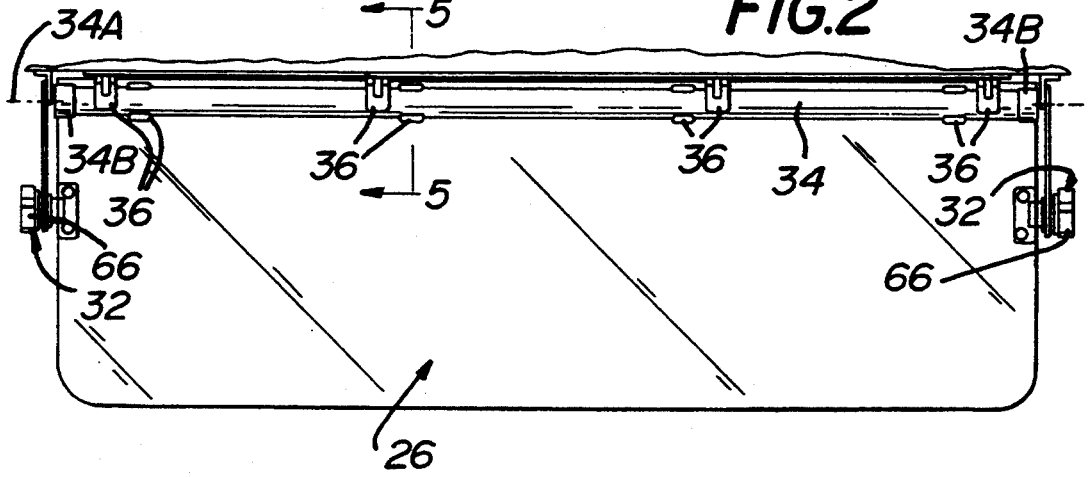
FIG. 2 is a rear plan view of the visor/windshield assembly of FIG. 1 shown in the extended position.
Figure 3:
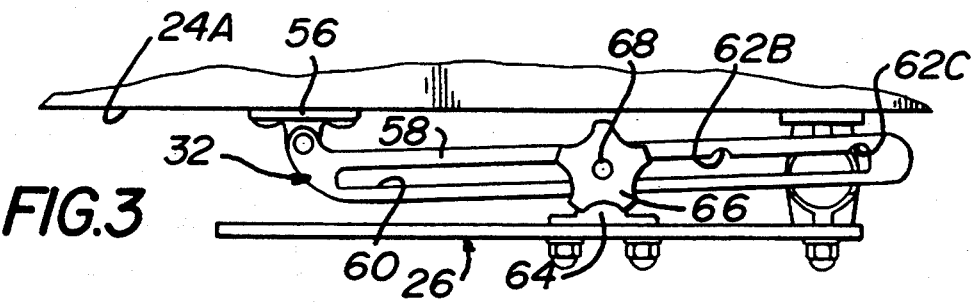
FIG. 3 is an end view of the visor/windshield assembly of FIG. 1 shown in the retracted position.

The pane 26 is a generally planar member which is mounted in a manner, to be described later, so that it can be moved from a retracted or stowed position out of the way of the windshield (such as is shown in FIGS. 3 and in phantom representation in FIG. 6), to an extended or in-service position (such as shown in FIGS. 1, 2, 4 and 6) wherein it covers or is disposed over a selected portion of the windshield 22 to reduce or block the passage of light therethrough, thereby protecting the eyes of the vessel's operator, or of other individual(s) on the vessel.

The overall size and shape of the panel 26 can be whatever is deemed appropriate for the particular windshield 22 or other viewing area. In the embodiment shown herein the panel 26 is an elongated rectangle, e.g., having a width of 6 inches (15.24 cm), 12 inches (30.48 cm), 18 inches (45.72 cm), 24 inches (60.96 cm), or even longer, and having a length of 24 inches (60.96 cm), 36 inches (91.44 cm), 48 inches (121.92 cm), or even longer, and is formed of a relatively thin, e.g., ¼ inch (0.64 cm), material for attenuating (reducing) light passing therethrough. Various plastics or glass are commercially available for reducing sun glare or providing appropriate desired degrees of shading. In fact, the material forming the panel can even be opaque for completely blocking any light from passing therethrough, such as with conventional automobile sun visors. One particularly effective material for providing a panel 26 with glare reducing properties, yet which can be readily viewed therethrough is a colored acrylic, like that sold by Rohm and Haas Company under the trademark PLEXIGLASS 2064 (gray) acrylic. That material is merely one example of various materials, either transparent, translucent, or opaque, which can be used to form the visor/windshield panel 26 of this invention. However, in the preferred embodiment of the invention wherein the panel 26 has light-attenuating properties, the panel is formed of a plastic panel, such as that sold by Rohm and Haas Company under the trademark PLEXIGLASS 2064.

The movable and releasably securable subassembly 28 serves to pivotally mount the panel 26 onto any appropriate structural portion 24A (FIG. 1–5) or 24B (FIG. 6) of the vessel adjacent the windshield 22 so that the panel 26 can be moved from its stowed position to its in service position and vice versa. For example, the structural support can be the ceiling of the vessel's cabin, or the bottom or front wall of an instrument panel secured to the ceiling of the vessel's cabin. Moreover, the subassembly 28 enables the panel 26 and selected portions of it (to be described later) to be removed as a unit from the remainder of the visor/windshield assembly 20 to enable the removed unit to be stored when its use is not required.

The details of the subassembly 28 are best seen in FIGS. 1, 2, 4 and 5. As can be seen therein the subassembly 28 basically comprises an elongated rigid member in the form of a tube 34, and plural connector/mounting brackets 36. The tube 34 is arranged to be secured along the top edge of the panel 26 by a group of the connector/mounting brackets 36 to form a removable visor/windshield unit (to be described later). Another group of the mounting brackets 36 is fixedly secured to the vessel via the mounting devices 30 (only one of which is shown FIG. 4) and serves to releasably and pivotally mount the visor/windshield unit thereon.

Each of the plural connector/mounting brackets 36 is of identical construction and is a generally C-shaped member having a circular recess 40 (FIG. 5) for receipt of the tube 34 therein so that the tube can rotate therein about its longitudinal axis 34A. In the preferred embodiment the C-shaped connector/brackets 36 are conventional plastic plumbing components, commonly referred to as tube hangers, such as is sold by Genova Products of Davison Michigan, under the model designation "500 series." Most preferably the C-shaped connector/brackets 36 employed in this invention are identified as part number 52107. Other generally C-shaped connector/brackets can be used in lieu of the Genova tube hangers.

In any event, as can be seen clearly in FIG. 5, each connector/bracket 36 includes a planar base portion 42 having a hole 44 therein for enabling the connector/bracket to be mounted and secured by a threaded fastener, e.g., a machine screw 46 and associated nut 48 to some other component, e.g., the panel 26 or the structural portion 24A or 24B of the vessel. Thus, in the embodiment shown herein a first group of four of the connector/brackets 36 are fixedly secured at equidistantly spaced, axially aligned positions along the top edge of the panel 26 by associated machine screws 46 extending through holes 50 in the panel. The screws are secured by associated cap nuts 48. Nylon (or other material) washers 54 are interposed between the cap nuts and the panel 26.

The tube 34 is an elongated member of approximately the same length as the panel 26 and is preferably formed of a rigid material so that when it is connected to the panel 26, as just described, it provides additional rigidity and structural strength to the panel.

In fact, in the preferred embodiment wherein the panel 26 is formed of PLEXIGLASS or other plastic material, the connection of the tube 34 to the group of brackets 36 attached to the panel prevents the panel from bowing or distorting over time, a problem which is particularly troublesome when the panel 26 is long (e.g., on the order of 36 inches (91.44 cm) or greater).

In a preferred embodiment the tube is a 1 inch (2.54 cm) diameter, hollow anodized aluminum tube. The wall thickness of the tube may be from 0.049 inch (1.2 mm) to 0.065 inch (1.6 mm) thick. Other materials, such as stainless steel, chrome plated brass, and various plastics, can be used to form the tube 34. In fact, the tube need not be tubular at all, but may be a solid rod. In any case, the outer diameter of the tube or rod can be of any suitable size, depending upon the inside diameter of the recess 40 in connector/bracket members 36 receiving the tube. A pair of plastic caps 34B are secured to the ends of the tube 34 to finish it off.

Referring to FIGS. 1-5, the tube 34 is snap-fit within the axially aligned recesses 40 in the first group of connector/brackets 36. A second group of four of the connector/brackets 36 are fixedly secured at equidistantly spaced axially aligned positions along the horizontal surface 24A of the vessel 24 by associated machine screws 46 and nuts 48. Those screws and nuts form a portion of the mounting devices 30 identified heretofore. Pointed screws (not shown) may be used in place of the machine screw and cap nuts to secure the second group of connector/brackets to the surface 24A of the vessel 24.

In addition to the screws and nuts the mounting devices 30 also include a spacer strip 52. The spacer strip comprises a generally planar elongated strip of material, e.g., a plastic like that forming the panel 26, which is interposed between the planar bases of the second group of connector/brackets 36, and the surface 24A of the vessel 24 to provide appropriate clearance to enable the desired pivoting action of the panel, as will be described later.

As can be seen clearly in FIGS. 1 and 2, the connector/brackets 36 of the second group are located immediately adjacent and outside the connector/brackets 36 of the first group and are arranged to releasably receive, e.g., snap-fit, the tube 34 within their aligned recesses 40 so that the tube can be rotated or pivoted about its longitudinal axis 34A with respect to those connector/brackets. As should be appreciated by those skilled in the art, this arrangement enables the panel 26 to be pivoted from the stowed position shown in FIG. 3 to the extended, in-service position shown in FIGS. 1, 2 and 4, and vice versa. The spacer strip ensures that there is sufficient clearance between the tube 34 and the undersurface 24A of the vessel to permit unimpeded pivoting action.

As will be appreciated by those skilled in the art the location of the connector/brackets 36 of the second group adjacent and outside the connector/brackets 36 of the first group ensures that the visor/windshield panel 26 cannot slide longitudinally along the axis of tube 34 when a transverse force is applied to the panel, such as when the visor is being operated from the side. This precludes the panel 26 and the connector/brackets attached thereto from being slid axially off of the tube 34. Other arrangements of connector/brackets 36 can be made to achieve that same end, e.g., only two of the connector/ brackets 36 of the second group need be located adjacent, and outside and/or inside two connector/brackets 36 of the first group.

Referring to FIGS. 3, 4 and 6, in order to hold the panel 26 at either the retracted position or the extended position (or at a position intermediate the retracted and extended positions, for that matter) the visor/windshield assembly 20 includes the two heretofore identified holding subassemblies 32. Each of the subassemblies 32 is a conventional device, commonly called a windshield adjuster, such as is sold by Perko Incorporated of Miami, Florida, under the model designation 1291. Thus, each subassembly comprises a bracket 56 fixedly secured by threaded fasteners onto a respective portion 24A of the vessel. An elongated arm 58 having an elongate slot 60 extending along substantially all of its length is pivotally mounted on the bracket 56. The slot 60 includes plural notches 62A, 62B, and 62C, located at spaced locations therealong. Each of the subassemblies 32 also includes a second bracket 64. The second bracket 64 of each of the subassemblies 32 is fixedly secured, e.g., bolted, onto a respective end of the visor/windshield panel 26. Each of the second brackets also includes an associated knob 66 having a pin 68 projecting inwardly therefrom through the bracket 64 into the slot 60 in the arm 58.

Still referring to FIGS. 3, 4 and 6, the knob and pin are arranged so that when the knob 66 is loosened the pin 68 is free to slide within the slot 60 as the panel 26 is pivoted between the retracted and extended positions and vice versa. The knob 66 is arranged to be tightened to lock the pin 68 with respect to the slot 60, and thereby hold the panel 26 at the established pivoted position. In this regard the notches 62A, 62C, and 62B establish the retracted, extended and intermediate positions, respectively, of the panel 26. Thus, when the pin 68 of the knob 66 is located in the notch 62A and the knob tightened, the panel will be held in the retracted position. When the pin of the knob 66 is located in the notch 62C and the knob tightened the panel will be held in the extended position. When the pin of the knob 66 is located in the notch 62B and the knob tightened the panel will be held in a intermediate position between the retracted and extended positions.

As mentioned earlier the visor/windshield panel 26 is arranged to be removed from the vessel, when desired. This is achieved by grasping the panel and pulling it and its fixedly secured first group of connector/brackets 36 and the tube 34 mounted therein away from the second group of connector/brackets, whereupon the rod 34 is released from the recesses 40 in the second group of connectors/brackets 36. Accordingly, the panel 26, the first group of connector/brackets 36 and the tube 34 form a removable unit, which may be stored at any convenient location on the vessel or on shore until the visor/windshield is needed. Of course, the pin 68 of the knob 66 must be removed from the bracket 64 to permit complete separation and removal of the removable unit.

It should be pointed out at this juncture that the number of connector/brackets utilized to pivotally connect the panel to the vessel is a matter of design choice. Thus, the assembly 20 can make use of more or less than the eight connector/brackets described above. In fact, it is contemplated that as few as two connector/brackets 36 may be used to mount the tube 34 to the panel 26 to form the removable visor/windshield unit, and that as few as two connector/brackets 36 may be used to releasably mount that visor/windshield unit onto the vessel 24.

Without further elaboration the foregoing will so fully illustrate my invention that others may, by applying current or future knowledge, adapt the same for use under various conditions of service.

What is claimed is:

1. A visor/windshield assembly for mounting on a vessel, said visor/windshield assembly comprising a movable panel, pivotal connection means, and mounting means, said pivotal connection means comprising at least one elongated rigid member having an outer surface of a circular cross-section, at least four conventional, unitary, generally C-shaped clip members, each of said clip members including one end with a circular recess for receiving the circular cross-section of the rigid member, said one end including spaced-apart edges defining an opening into said circular recess, the opening being less than the diameter of the rigid member, said one end of the clip member being sufficiently flexible to ..allow insertion of the rigid member through the opening and into the circular recess for providing a snap-fit connection between the rigid member and the circular recess to retain the elongate rigid member within the circular recess, a first and a second of said clip members being fixedly secured to said panel at spaced locations therealong with the circular recesses of said first and second clip members in axial alignment for releasably receiving said rigid member within the recesses of said first and second clip members through said snap-fit connection, a third and fourth of said clip members being fixedly secured by said mounting means to said vessel at spaced locations with the circular recesses of said third and fourth clip members in axial alignment for releasably receiving said rigid member within the recesses of said third and fourth clip members through said snap-fit connection, said rigid member having a longitudinal axis and being rotatable about said axis within the circular recesses of clip members, whereupon said panel is pivotal from a retracted position to an extended position, said panel, in said extended position, being in the general line of sight of a person on said vessel, said panel, said clip members fixedly secured to said panel, and the elongated rigid member being removable as a unit from the clip members fixidly secured by said mounting means to said vessel by snapping the elongated rigid member out of said snap fit connection with the circular recesses of the clip members fixedly secured by said mounting means to said vessel.

2. The visor/windshield assembly of claim 1 wherein said rigid member enhances the rigidity of said panel.

3. The visor/windshield assembly of claim 1 wherein said rigid member is rotatable about its longitudinal axis with respect to said first and second clip members.

4. The visor/windshield assembly of claim 1 wherein said rigid member is rotatable about its longitudinal axis with respect to said third and fourth clip members.

5. The visor/windshield assembly of claim 3 wherein said rigid member is rotatable about its longitudinal axis with respect to said third and fourth clip members 6. The visor/windshield assembly of claim 1 wherein said panel is formed of a colored acrylic, said clip members are formed of plastic, and said rigid member is formed of aluminum.

7. The visor/windshield assembly of claim 1 wherein said panel is formed of a material which completely blocks the passage of light therethrough.

8. The visor/windshield assembly of claim 1 wherein said panel is formed of a material which reduces glare of light passing therethrough.

9. The visor/windshield assembly of claim 1 wherein said panel is plastic.

10. The visor/windshield assembly of claim 2 wherein said panel is plastic.

11. The visor/windshield assembly of claim 1 wherein said third and fourth generally C-shaped clip members are positioned relative to said first and second generally C-shaped clip members for precluding said panel and the first and second C-shaped clip members from being slid axially off the rigid member.

12. The visor/windshield assembly of claim 11 wherein said third and fourth clip members are disposed closely adjacent and outside said first and second clip members, respectively.

13. The visor/windshield assembly of claim 11 wherein said third and fourth clip members are disposed closely adjacent and inside said first and second clip members, respectively.

14. The visor/windshield assembly of claim 1 additionally comprising holding means for selectively holding said panel in said retracted position or in said extended position.

15. The visor/windshield assembly of claim 14 wherein said holding means is adjustable for selectively holding said panel in said retracted position, or in said extended position, or in an intermediate position.

16. The visor/windshield assembly of claim 1 wherein said panel comprises a sheet of a light-attenuating material.

17. The visor/windshield assembly of claim 1 wherein said vessel includes a windshield, said panel, in said retracted position, being located remote from a predetermined portion of said windshield through which a person operating said vessel will look, and in said extended position, being located over said predetermined portion of said windshield to attenuate light passing therethrough to the eyes of said person.

18. The visor/windshield assembly of claim 1, said panel being a clear material for passing visible light therethrough.

19. The visor/windshield assembly of claim 1, wherein said rigid member is a hollow tube.

20. The visor/windshield assembly of claim 1, wherein said rigid member is a solid rod.

* * * * *